United States Patent Office 2,890,208
Patented June 9, 1959

2,890,208
PREPARATION OF LACTONE POLYESTERS

Donald M. Young, New York, N.Y., and Fritz Hostettler, Charleston, and Christian F. Horn, South Charleston, W. Va., assignors to Union Carbide Corporation, a corporation of New York No Drawing. Application April 13, 1956
Serial No. 577,952

18 Claims. (Cl. 260—78.3)

This invention relates to an improved process for polymerizing lactones to form polyesters that are useful as plasticizers.

The facility with which the various lactones react and polymerize upon reaction with an organic compound having at least one hydroxyl or amino radical, such a compound being referred to herein as a mono- or polyfunctional initiator, to form polyesters having terminal hydroxyl groups has been found to vary considerably. Thus, for example, dimethyl and epsilon-methyl substituted epsilon-caprolactones are difficult to react and polymerize, even with the use of strongly basic ester exchange catalysts, without causing the product to be discolored.

We have made the surprising discovery that the polymerization of lactones generally can be accelerated very much more, without incurring discoloration of the resulting polyesters, than had hitherto been thought possible and that such improvement in the polymerization of lactones applies specifically also to such difficultly polymerizable lactones as epsilon-methyl-caprolactone and the various dimethyl-epsilon-caprolactones. In accordance with the invention, this improvement in the polymerization of lactones is brought about by carrying out the reaction in the presence of a catalytic amount of an organic tin compound or an organic salt of lead or manganese.

The tin compounds that are particularly desirable as catalysts in the method of the invention because of their ability to promote the formation of virtually colorless polyesters in a very short reaction time are those of the general formulae:

and

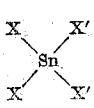

in which the X's stand for alkyl, aryl, aralkyl and aryloxy radicals, and the X''s stand for alkyl, aryl, aralkyl, acyloxy, halogen and hydroxy radicals. The tin compounds that deserve special mention because of their efficiency in accelerating the reaction and producing virtually colorless polyesters are tetraphenyltin, tetraoctyltin, diphenyltin dilaurate, tri-n-butyltin hydroxide, tri-n-butyltin acetate, dimethyltin oxide, dibutyltin oxide, dilauryltin oxide, di-n-butyltin dichloride, and dioctyltin dichloride.

The organic salts of lead and manganese that have been found especially effective as catalysts include lead acetate, manganese acetate, lead 2-ethylhexoate, lead salicylate and lead benzoate.

While the method of the invention is particularly useful in the polymerization of lactones that are difficult and perhaps even impossible to polymerize by other means, it is also of considerable advantage in the polymerization of other lactones that are not difficult to polymerize. The method has the unique distinction of not only reducing reaction time very substantially, i.e., from a matter of days and even weeks to a few hours and even less, but also of minimizing and in most instances avoiding discoloration of the end product.

The lactone used as a starting material may be any lactone, or combination of lactones, preferably having six or more carbon atoms in the ring. The lactones preferred as starting materials in the method of the invention are those having the general formula:

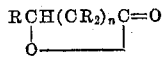

wherein $n$ is at least four, at least $n+2$ R's are hydrogen, the remainder of the R's are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Lactones having greater numbers of substituents other than hydrogen on the ring are considered unsuitable for the purposes of the invention because of the tendency that polymers thereof have to revert to the monomer, particularly at elevated temperature. Unsubstituted epsilon-caprolactone, in which $n$ is four and all the R's are hydrogen, is derived from 6-hydroxyhexanoic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955. The cyclohexanones may be obtained from substituted phenols or by other convenient synthetic routes.

Among the substituted epsilon-caprolactones considered most suitable as starting materials in the method of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones. Mixtures of substituted lactones and mixtures of substituted lactones with unsubstituted lactones have been found to be particularly desirable.

Lactones having more than six carbon atoms in the ring, e.g., zeta-enantholactone and eta-caprylolactone, may also be polymerized in accordance with the method of this invention.

The initiators that are preferred in the method of the invention are represented by the general formula

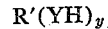

in which R' is an organic radical selected from the group consisting of aliphatic, cycloaliphatic, aromatic and heterocyclic radicals, $y$ is a number equal to the functionality of the initiator, and the Y's stand for —O—, —NH— and —NR''—, R'' being alkyl, aryl, aralkyl or cycloalkyl. These include monofunctional initiators such as alcohols and amines that have a reactive site capable of opening the lactone ring and adding it onto the initiator as an open chain without forming water of condensation, and polyfunctional initiators such as polyols, polyamines, amino alcohols, and vinyl polymers, as well as amides, sulfonamides, hydrazones, semicarbazones and oximes having two or more such reactive sites.

Alcohols that are useful as monofunctional initiators include primary, secondary, and tertiary aliphatic alcohols such as methanol, ethanol, propanol, isopropanol, 1-butanol, 2-butanol, tert.-butanol, 1-pentanol, 3-pentanol, tert.-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methy carbinol; and cycloaliphatic alcohols such as cyclohexanol and trimethylcyclohexanol.

Amines that are useful as monofunctional initiators include primary and secondary aliphatic amines such as methyl, ethyl, n-propyl, isopropyl, n-butyl, sec.-butyl, isobutyl, tert.-butyl, n-amyl, n-hexyl and 2-ethylhexylamine, as well as the corresponding dialkyl amines; aromatic amines such as aniline, ortho-toluidine, meta-toluidine, para-toluidine, and diphenylamine; cycloaliphatic amines such as cyclohexyl- and dicyclohexylamine; and heterocyclic amines such as pyrrolidine, piperidine, and morpholine.

Diols that are suitable as bifunctional initiators include glycols of the formula $HO(CH_2)_nOH$ in which $n$ equals 2 to 10, glycols of the formulae $HO(CH_2CH_2O)_nH$ and $HO(CHCH_3CH_2O)_nH$ in which $n$ equals 1 to 40, 2,2-dimethyl-1,3-propanediol, 2,2-diethyl-3-propanediol, 3-methyl-1,5-pentanediol, N-methyl- and N-ethyl diethanolamines, various cyclohexanediols,

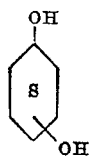

4,4'-methylenebiscyclohexanol,

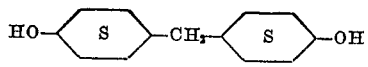

4,4'-isopropylidenebiscyclohexanol,

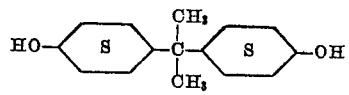

various xylenediols,

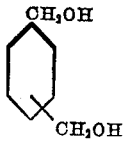

various hydroxymethyl-phenethyl alcohols,

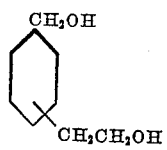

various hydroxymethyl-phenylpropanols,

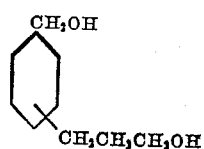

various phenylenediethanols,

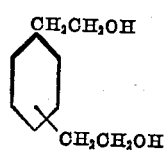

various phenylenedipropanols,

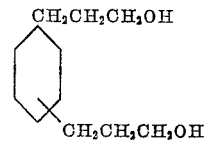

and various heterocyclic diols such as 1,4-piperazine diethanol,

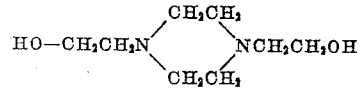

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamido, or carboxyl groups. They are obtainable by reacting diols of the class $HO(CH_2)_nOH$, where $n$ equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorous acid; aliphatic, aromatic, and cycloaliphatic primary monoamines, like methylamine, ethylamine, propylamine, butylamine, aniline, cyclohexylamine; secondary diamines, like N,N'-dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

The preparation of the polyoxyalkylated derivatives is illustrated by the reaction of 1,4-butanediol with ethylene oxide:

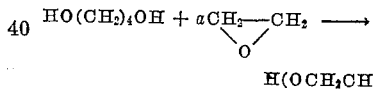

$H(OCH_2CH_2)_bO(CH_2)_4O(CH_2CH_2O)_cH$ where $a = b + c = 1$ to 40.

Further useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides, or anhydrides of inorganic and organic acids; and inorganic acids or anhydrides thereof whose anions show little tendency to polarize. Polymers containing hydroxyl end-groups may be obtained by treating these products with alkaline reagents upon completion of the polymerization reaction. Among suitable monoepoxides for preparing such polymers are tetrahydrofuran, trimethylene oxide, propylene oxide, ethylene oxide, or mixtures thereof.

Higher functional alcohols suitable for initiating the polymerization of lactones include triols such as glycerol, trimethylolpropane, 1,2,4-butanetriol, 1,2,6-hexanetriol, N-triethanolamine, and N-triisopropanolamine; various tetrols like erythritol, pentaerythritol, N,N,N',N'-tetrakis(2-hydroxyethyl)ethylenediamine,

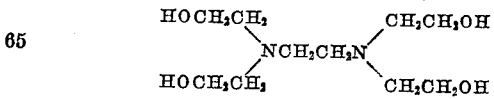

and N,N,N',N'-tetrakis(2-hydroxypropyl)ethylenediamine;

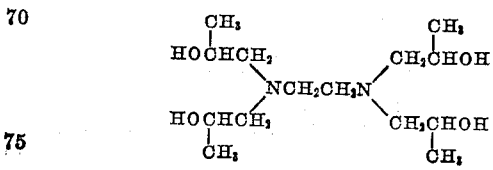

pentols, hexols, like dipentaerythritol and sorbitol; alkyl glycosides; and carbohydrates such as glucose, sucrose, starch, and cellulose.

Also suitable as polyols are the polyoxyalkylated derivatives of polyfunctional compounds having three or more reactive hydrogen atoms as, for example, the reaction product of trimethylolpropane with ethylene oxide in accordance with the reaction:

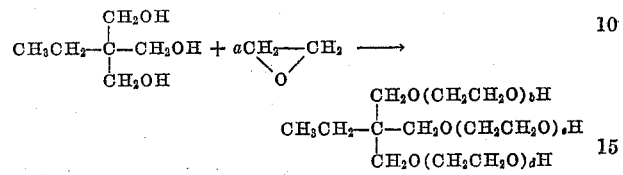

where $a=b+c+d=3$ to 45.

In addition to the polyoxyalkylated derivatives of trimethylolpropane, those of the following compounds are likewise suitable: glycerol, 1,2,4-butanetriol, 1,2,6-hexanetriol, erythritol, pentaerythritol, sorbitol, methyl glycosides, sucrose, diamines of the general formula $H_2N(CH_2)_nNH_2$, where n equals 2 to 10, 2-(methylamino)ethylamine, various phenylene- and toluenediamines, benzidine, 3,3'-dimethyl-4,4'-biphenyldiamine, 4,4' - methylenedianiline, 4,4',4'' - methylidynetrianiline, cycloaliphatic diamines, like 2,4-cyclohexanediamine and 1-methyl-2,4-cyclohexanediamine, amino alcohols of the general formula $HO(CH_2)_nNH_2$, where $n$ equals 2 to 10, diethylenetriamine, triethylenetetramine, tetraethylenepentamine, poly-carboxylic acids like citric acid, aconitic acid,

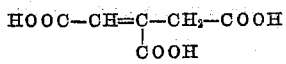

mellitic acid,

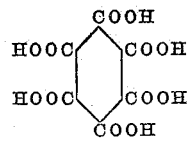

and pyromellitic acid,

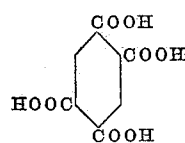

and polyfunctional inorganic acids like phosphoric acid.

Difunctional amino alcohols capable of initiating the polymerization of lactones include aliphatic amino alcohols of the general formula $HO(CH_2)_nNH_2$, where n equals 2 to 10, N-methylethanolamine,

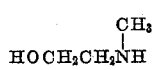

isopropanolamine,

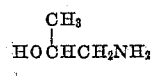

N-methylisopropanolamine,

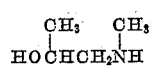

aromatic amino alcohols like para-amino-phenethyl alcohol,

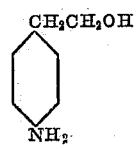

and para-amino-alpha-methylbenzyl alcohol,

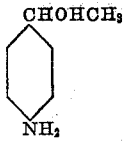

and various cycloaliphatic amino alcohols like 4-aminocyclohexanol

Higher functional amino alcohols having a total of at least three hydroxy and primary or secondary amino groups that are suitable include diethanolamine, diisopropanolamine, 2-(2-aminoethylamino)ethanol

2-amino-2(hydroxymethyl)-1,3-propanediol,

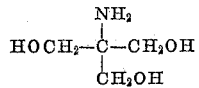

and 2-amino-2-methyl-1,3-propanediol

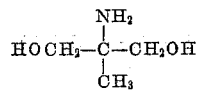

Suitable diamines include aliphatic diamines of the general formula $H_2N(CH_2)_nNH_2$, monosecondary diamines of the general formula $R''NH(CH_2)_nNH_2$, and disecondary diamines of the general formula $$R''NH(CH_2)_nNHR''$$

where n equals 2 to 10 and where R'' is alkyl, aryl, aralkyl or cycloalkyl; aromatic diamines, like meta-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4,4'-biphenyldiamine, 3,3'-dichloro-4,4'-biphenyldiamine, 4,4'-methylenedianiline, 4,4'-ethylenedianiline, 2,3,5,6-tetramethyl-para-phenylenediamine, 2,5-fluorenediamine, and 2,7-fluorenediamine; and cycloaliphatic diamines like 1,4-cyclohexanediamine, 4,4'-methylenebiscyclohexylamine, and 4',4-isopropylidenebiscyclohexylamine, and heterocyclicamines such as piperazine, 2,5-dimethylpiperazine, and 1,4 - bis(3-amino - propyl) piperazine

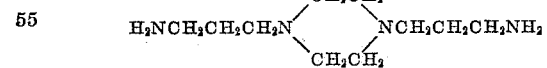

Higher functional polyamines typical of those suitable for use in the method are: diethylenetriamine, triethylenetetramine, tetraethylenepentamine, diisopropylenetriamine, triisopropylenetetramine, tetraisopropylenepentamine, 1,2,5 - benzenetriamine, toluene - 2,4,6 - triamine, 4,4',4''-methylidynetrianiline,

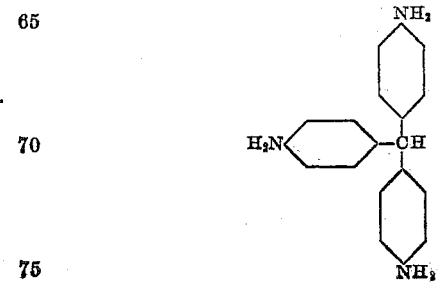

and polyamines obtained by interaction of aromatic monoamines with formaldehyde or other aldehydes, for example:

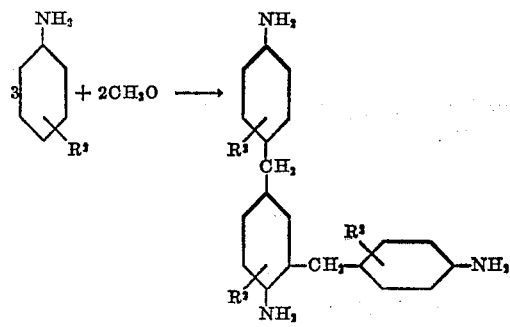

and other reaction products of the above general type, where $R^2$ is H or alkyl.

Lactones will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula:

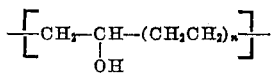

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, or para-aminostyrene

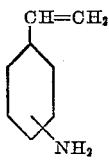

3-butene-1,2-diol $CH_2{=}CH{-}CHOH{-}CH_2OH$, allyl alcohol, methallyl alcohol, 3-phenyl-3-butene-1-ol,

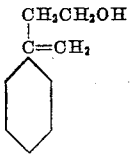

and vinyl ethers like diethylene glycol monovinyl ether $CH_2{=}CH{-}OCH_2CH_2OCH_2CH_2OH$.

A monofunctional initiator is believed to open the lactone ring to produce an ester having one terminal hydroxyl group that is capable of opening further lactone rings and thereby of adding more and more lactone to the molecule. Thus, for example, the polymerization of epsilon-caprolactone initiated with a monoamine is believed to proceed as follows:

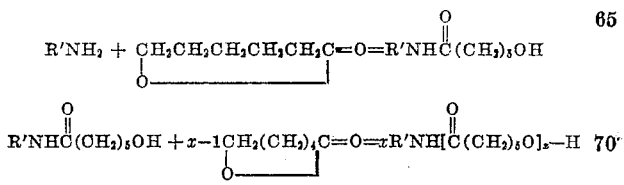

A polyfunctional initiator is believed to open the lactone ring in a similar manner but to produce an ester having several terminal hydroxyl groups that are capable of opening further lactone rings and thereby of adding more and more lactone to the molecule. Thus, for example, the polymerization of epsilon-caprolactone initiated with a diol is believed to take place primarily as follows:

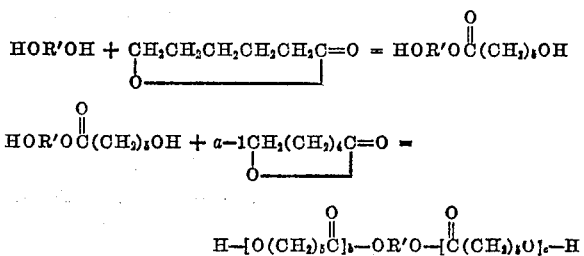

wherein $a$ is the total number of mols of lactone reacted per mol of initiator and $b+c=a$.

It will be apparent from these equations that the number of lactone residues in the final polyester will depend in large part upon the molar ratio of lactone to initiator.

The polymerization is, in accordance with the invention, carried out by heating a lactone, or combination of lactones, with an initiator in the presence of the catalyst. Generally, the catalyst should be present in a catalytically significant amount, i.e., between about 0.001 and about 1% by weight, based on the amount of lactone in the reaction mixture. The preferred range of concentration for the catalyst is between about 0.01 and about 0.2%, this more limited range being preferred because of the uniformly excellent results that are obtained. Very small concentrations below the preferred minimum of 0.01% are, however, effective in providing fairly satisfactory polymerization rates. Amounts in excess of the maximum preferred amount of 0.2% shorten reaction time and are not harmful, although amounts in excess of about 1% should be avoided in order to avoid discoloration of the polyester.

The temperature to which the reactants are heated may vary from about 50 to about 300° C. Temperatures above this range are to be avoided because of the instability of the reactants and the products at such higher temperatures, whereas reaction temperatures below about 50° C. will result in prolonged reaction time. Temperatures within the range of about 130–200° C. are preferred because discoloration of the products is thereby avoided while a desirably rapid rate of reaction is retained.

The time of heating depends upon the particular combination of lactone and initiator, as well as upon the particular catalyst employed and its concentration. It is readily ascertainable for any given starting materials, catalyst, catalyst concentration and temperature conditions by following the progress of the polymerization with refractive index measurements. The reaction may be regarded as complete as soon as the refractive index becomes constant. Generally, the reaction time will vary from a few minutes to not more than forty-eight hours and more usually between about one and twenty-four hours.

It is preferable, in order to obtain a product of light color, to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120 to 160° C.

The proportion of lactone to initiator may vary widely depending upon the particular properties desired in the polyester or the products to be made therefrom. Where the polyester is to have substantially the properties of a product having a succession of lactone residues, the proportion of initiator to lactone may be very small, inasmuch as theoretically one molecule of initiator is sufficient to initiate the polymerization of an infinite number of lacetone molecules. On the other hand, where a poly-functional initiator is used and it is desired that the polyester product be of a conjugated structure in which the random distribution of lactone residues and polyfunctional compound residues is more or less alternating or where the polyfunctional initiator is a high molecular weight material such as a polyethylene glycol or vinyl polymer, the relative proportions may be approximately equal.

The polyester polymerization products obtained in accordance with the invention have molecular weights generally within the range of about 500 to about 12,000, hydroxyl numbers between about 15 and about 350, carboxyl numbers up to about 7 and preferably below 5, and at least one active terminal group, usually hydroxyl, the number of active terminal groups depending upon the functionality of the initiator.

In addition, the polyesters of the invention are eminently suitable as plasticizers in various resins, e.g., vinyl chloride-vinyl acetate resins, particularly if they are acylated in known manner to insolubilize the terminal hydroxyl groups and thus improve their resistance to extraction by water from resins with which they are combined.

As plasticizers, the polylactones of the invention have the unique advantage, hitherto so elusive in the development of plasticizers, of combining excellent low temperature performance, i.e., imparting good flexibility to resins even at temperatures below zero, with low volatility and high resistance to water and oil extraction. They are available as easily-pourable liquids, and are therefore susceptible to facile handling and mixing as compared with the highly viscous, non-pourable plasticizers heretofore available. At the same time, the plasticizers of the invention are non-toxic and light-stable.

In the following detailed examples, which are included to illustrate the best modes now contemplated for carrying out the invention, initiators, lactones and catalysts, of varying amounts and identities, were mixed and heated to a controlled temperature of 170° C. while a slow stream of nitrogen was passed through the mixture to exclude air and moisture, thus preventing discoloration of the polyester from oxygen. The hydroxyl and carboxyl numbers of the resulting polyesters were determined by the method described in Ind. Eng. Chem., Anal. Ed., vol. 17, page 394 (1945). The polymerization was followed by refractive index measurements at 30° C., the reaction being regarded as complete as soon as the index became constant. Example 1 was included to compare the effectiveness of representative organic tin catalysts used in accordance with the invention with the effectiveness of a typical strongly basic ester exchange catalyst. The particular catalysts, the amounts used, the polymerization time and the molecular weight and color of the polyester products are indicated.

Example 1

| | |
|---|---|
| Lactone | 150 g. dimethyl-epsilon-caprolactones (mixture synthesized from a xylenol fraction boiling from 212–219° C.). |
| Initiator | 4.25 g. ethylene glycol. |
| Catalyst | 0.08 g. calcium methoxide. |
| Reaction time | 72 hours. |
| Hydroxyl number | 44.6. |
| Carboxyl number | 2.9. |
| Molecular weight | 2220. |
| Color | Brown. |

Example 2

| | |
|---|---|
| Lactone | 169 g. dimethyl-epsilon-caprolactones (same mixture as in Example 1). |
| Initiator | 4.80 g. ethylene glycol. |
| Catalyst | 0.09 dibutyltin oxide. |
| Reaction time | 4.5 hours. |
| Hydroxyl number | 48.0. |
| Carboxyl number | 2.1. |
| Molecular weight | 2170. |
| Color | Colorless. |

Examples 1 and 2 show the remarkably superior efficacy, with regard to color of the polyester and the reaction time, of dibutyltin oxide as compared with that of calcium methoxide in polymerizing dimethyl lactone mixtures.

Example 3

| | |
|---|---|
| Lactone | 100 g. beta-, gamma-, and delta- methyl-epsilon-caprolactones. |
| Initiator | 3.50 g. propylene glycol. |
| Catalyst | 0.10 g. dibutyltin oxide. |
| Reaction time | 2.0 hours. |
| Hydroxyl number | 46.6. |
| Carboxyl number | 0.7. |
| Molecular weight | 2340. |
| Color | Colorless. |

Example 4

| | |
|---|---|
| Lactone | 300 g. beta-, gamma-, and delta- methyl-epsilon-caprolactones. |
| Initiator | 250 g. polyethylene glycol (average molecular weight: 1000). |
| Catalyst | 0.30 g. dibutyltin oxide. |
| Reaction time | 3.0 hours. |
| Hydroxyl number | 47.7 |
| Carboxyl number | 1.0. |
| Color | White wax. |

Example 5

| | |
|---|---|
| Lactone | 25 g. alpha and epsilon-methyl - epsilon - caprolactones (obtained from o-cresol) and 75 g. beta-, gamma-, and delta-methyl - epsilon - caprolactones. |
| Initiator | 6.3 g. 2,2 - diethyl - 1,3-propanediol. |
| Catalyst | 0.10 dibutyltin oxide. |
| Reaction time | 6.0 hours. |
| Hydroxyl number | 48.5. |
| Carboxyl number | 1.0. |
| Color | Colorless. |

Example 6

| | |
|---|---|
| Lactone | 100 g. beta-, gamma-, and delta - methyl - epsilon-caprolactones. |
| Initiator | 5.45 g. N-methyldiethanolamine. |
| Catalyst | 0.05 g. dibutyltin oxide. |
| Reaction time | 1.0 hours. |
| Hydroxyl number | 45.5. |
| Carboxyl number | 2.1 |
| Color | Light brown. |

Example 7

| | |
|---|---|
| Lactone | 50 g. epsilon-caprolactone and 50 g. beta-, gamma-, and delta-methyl-epsilon-caprolactones. |
| Initiator | 5.6 g. quinitol. |
| Catalyst | 0.10 g. dibutyltin oxide. |
| Reaction time | 2.0 hours. |
| Hydroxyl number | 50.1 |
| Carboxyl number | 1.0. |
| Color | Light yellow. |

Example 8

| | |
|---|---|
| Lactone | 100 g. beta-and delta-methyl-epsilon-caprolactones. |
| Initiator | 4.65 g. hexamethylenediamine. |
| Catalyst | 0.05 g. dibutyltin oxide. |
| Reaction time | 18 hours. |
| Hydroxyl number | 39.9. |
| Carboxyl number | 1.0. |
| Color | Yellow. |

Example 9

| | |
|---|---|
| Lactone | 100 g. alpha and epsilon-methyl-epsilon-caprolactones and 250 g. beta-, gamma-, and delta-methyl-epsilon-caprolactones. |
| Initiator | 12.2 g. toluene-2,4-diamine. |
| Catalyst | 0.08 g. dibutyltin oxide. |
| Reaction time | 16 hours. |
| Hydroxyl number | 28.7. |
| Carboxyl number | 1.3. |
| Color | Brown. |

Example 10

| | |
|---|---|
| Lactone | 90 g. epsilon-caprolactone, 90 g. alpha and epsilon-methyl-epsilon-caprolactones and 170 g. beta-, gamma- and delta-methyl-epsilon-caprolactones. |
| Initiator | 5.95 g. pentaerythritol. |
| Catalyst | 0.175 g. dilauryltin oxide. |
| Reaction time | 20 hours. |
| Hydroxyl number | 26.4 |
| Carboxyl number | 0.9. |
| Color | Yellow. |

Example 11

| | |
|---|---|
| Lactone | 100 g. beta- and delta-methyl-epsilon-caprolactones. |
| Initiator | 4.25 g. triisopropanolamine. |
| Catalyst | 0.05 g. dilauryltin oxide. |
| Reaction time | 17 hours. |
| Hydroxyl number | 34.9. |
| Carboxyl number | 1.3. |
| Color | Yellow. |

Example 12

| | |
|---|---|
| Lactone | 100 g. gamma-methyl-epsilon-caprolactone. |
| Initiator | 3.50 g. N-(aminoethyl)ethanolamine. |
| Catalyst | 0.02 g. dibutyltin oxide. |
| Reaction time | 16 hours. |
| Hydroxyl number | 46.4. |
| Carboxyl number | 1.9. |
| Color | Light brown. |

Example 13

| | |
|---|---|
| Lactone | 50 g. octyl-epsilon-caprolactones (synthesized from a mixture of octylphenols obtained by alkylation of phenol with 2-ethylhexanol). |
| Initiator | 1.45 g. ethylene glycol. |
| Catalyst | 0.025 g. dibutyltin oxide. |
| Reaction time | 45 hours. |
| Hydroxyl number | 40.5. |
| Carboxyl number | 0.9. |
| Color | Brown. |

Example 14

| | |
|---|---|
| Lactone | 29.6 g. octyl-epsilon-caprolactones (same as in Example 13) and 35 g. epsilon-caprolactone. |
| Initiator | 1.68 g. ethylene glycol. |
| Catalyst | 0.033 g. dibutyltin oxide. |
| Reaction time | 26.5 hours. |
| Hydroxyl number | 41.1 |
| Carboxyl number | 0.9. |
| Color | Brown. |

Example 15

| | |
|---|---|
| Lactone | 400 g. mixture of dimethyl-, ethyl-, trimethyl-, methylethyl- and propyl-caprolactones (prepared from a xylenol fraction boiling at 224–229° C.). |
| Initiator | 9.13 g. trimethylol propane. |
| Catalyst | 0.2 g. dibutyltin oxide. |
| Reaction time | 21 hours. |
| Hydroxyl number | 28. |
| Carboxyl number | 0.9. |
| Color | Yellow. |

Example 16

| | |
|---|---|
| Lactone | 139 g. mixture of substituted-epsilon-caprolactones (same as in Example 15) and 261 g. epsilon-caprolactone. |
| Initiator | 11.6 g. ethylene glycol. |
| Catalyst | 0.2 g. dibutyltin oxide. |
| Reaction time | 5.5 hours. |
| Hydroxyl number | 48.3. |
| Carboxyl number | 1.9. |
| Color | Light yellow. |

Example 17

| | |
|---|---|
| Lactone | 400 g. mixture of substituted-epsilon-caprolactones (prepared from commercial cresylic acid consisting of a mixture of cresols, xyenols and higher phenols and therefore having one-, two-, and three-carbon side chains at various positions on the ring). |
| Initiator | 1,2,4-butanetriol. |
| Catalyst | 0.2 g. dibutyltin oxide. |
| Reaction time | 5.5 hours. |
| Hydroxyl number | 41.4. |
| Carboxyl number | 0.9. |
| Color | Light yellow. |

Example 18

| | |
|---|---|
| Lactone | 139 g. mixture of substituted-epsilon caprolactones (same as in Example 17) and 261 g. epsilon-caprolactone. |
| Initiator | 11.6 g. ethylene glycol. |
| Catalyst | 0.2 g. dibutyltin oxide. |
| Reaction time | 3 hours. |
| Hydroxyl number | 49.2. |
| Carboxyl number | 1.3. |
| Color | Colorless. |

Example 19

- Lactone: 130 g. mixture of alpha-, beta-, gamma-, delta-, and epsilon-epsilon - methyl - caprolactones (prepared from mixed o-, m- and p-cresols) and 270 g. epsilon-caprolactone.
- Initiator: 11.6 g. ethylene glycol.
- Catalyst: 0.2 g. dibutyltin oxide.
- Reaction time: 4.5 hours.
- Hydroxyl number: 49.4.
- Carboxyl number: 0.8.
- Color: Yellow.

Example 20

- Lactone: 300 g. mixture of methyl-epsilon-caprolactones (same as in Example 19).
- Initiator: 28.1 g. triethanolamine and ethylene oxide adduct prepared by slowly adding 262 g. ethylene oxide to 298 g. triethanolamine at 120–130° C. over a period of seven hours, followed by removal of a small amount of unreacted ethylene oxide under reduced pressure. The adduct had a hydroxyl number of 580.
- Catalyst: 0.15 g. dibutyltin oxide.
- Reaction time: 6 hours.
- Hydroxyl number: 48.9.
- Carboxyl number: 1.3.
- Color: Yellow.

Example 21

- Lactone: 600 g. mixture of methyl-epsilon-caprolactones (same as in Example 19).
- Initiator: 36 g. 2-ethyl-1-hexanol.
- Catalyst: 0.3 g. dibutyltin oxide.
- Reaction time: 18.5 hours.
- Hydroxyl number: 26.1.
- Carboxyl number: 1.2.
- Molecular weight: 2150.
- Color: Yellow.

Example 22

- Lactone: 76.9 g. zeta-enantholactone and 68.5 g. epsilon-caprolactone.
- Initiator: 4.09 g. ethylene glycol.
- Catalyst: 0.07 g. dibutyltin oxide.
- Reaction time: 3 hours.
- Hydroxyl number: 45.7.
- Carboxyl number: 1.
- Color: White wax.

Example 23

- Lactone: 65 g. zeta-enantholactone and 65 g. of a mixture of methyl-epsilon-caprolactones.
- Initiator: 3.77 g. ethylene glycol.
- Catalyst: 0.07 g. dibutyltin oxide.
- Reaction time: 19 hours.
- Hydroxyl number: 46.8.
- Carboxyl number: 1.3.
- Color: Yellow.

Several representative substituted epsilon-caprolactones were polymerized by heating to various temperatures with an amount of ethylene glycol calculated to yield an average molecular weight of 2200 without a catalyst and with representative concentrations of the catalysts indicated in the table below. The catalyst concentrations are in terms of percent by weight of lactone and the procedure in each polymerization was to add the catalysts after the reactants had reached the indicated temperature. The progress of the polymerization was followed, and polymerization time was determined, by means of the refractive index, which becomes constant when polymerization is complete.

| Epsilon-Caprolactone | Catalyst | Catalyst Concentration, Percent | Temperature, ° C. | Time, hrs. |
|---|---|---|---|---|
| Mixed Alpha- and epsilon-methyl. | None | | 170 | 102 |
| Do | Dibutyltin oxide | 0.1 | 170 | 2 |
| Do | do | 0.05 | 170 | 4 |
| Do | do | 0.01 | 170 | 7.5 |
| Do | do | 0.1 | 150 | 6 |
| Do | do | 0.05 | 150 | 11.25 |
| Do | do | 0.01 | 150 | 21 |
| Do | do | 0.1 | 130 | 22 |
| Do | do | 0.05 | 130 | 21 |
| Do | do | 0.01 | 130 | 54 |
| Do | Dilauryltin oxide | 0.1 | 170 | 6 |
| Do | Di-n-butyltin dichloride. | 0.1 | 170 | 4.5 |
| Do | Tri-n-butyltin acetate. | 0.1 | 170 | 3.75 |
| Do | Tri-n-butyltin hydroxide. | 0.1 | 170 | 5.5 |
| Do | Tetraphenyltin | 0.1 | 170 | 5 |
| Beta, delta-dimethyl | Dibutyltin oxide | 0.05 | 170 | 0.75 |
| Gamma-methyl | do | 0.05 | 170 | 1 |
| Mixed beta- and delta-methyl. | do | 0.05 | 170 | 0.75 |
| Mixed alpha- and epsilon-methyl. | Lead 2-ethylhexoate. | 0.1 | 170 | 10.25 |
| Do | do | 0.05 | 170 | 21.5 |
| Do | do | 0.01 | 170 | 30 |
| Do | do | 0.05 | 150 | 47 |
| Do | do | 0.05 | 130 | 160 |
| Do | Lead acetate | 0.1 | 170 | 11 |
| Do | Lead salicylate | 0.1 | 170 | 20 |
| Do | Lead benzoate | 0.1 | 170 | 16 |
| Beta, delta-dimethyl. | Lead 2-ethylhexoate. | 0.05 | 170 | 5.5 |
| Gamma-methyl | do | 0.05 | 170 | 3.25 |
| Mixed beta- and delta-methyl. | do | 0.05 | 170 | 5.5 |
| Mixed alpha- and epsilon-methyl. | Manganese acetate | 0.1 | 170 | 10.25 |

The data in this table illustrates the remarkable efficacy of the preferred catalysts in accelerating the polymerization of the more difficultly polymerizable lactones.

It is apparent that various modifications will readily occur to those skilled in the art upon reading this description. All such modifications are intended to be included within the scope of the invention as defined in the accompanying claims.

We claim:

1. In a method of preparing a polyester by reacting, at a temperature up to about 300° C., a lactone having from six to eight carbon atoms in the ring with an organic compound having at least one reactive site capable of opening the lactone ring in a radical selected from the group consisting of hydroxyl and amino radicals attached thereto, the improvement which comprises carrying out the reaction in the presence of between about 0.001 and 1% by weight, based on the weight of lactone, of a catalyst selected from the group consisting of organic tin compounds having at least one carbon to tin bond and carboxylic acid salts of lead and manganese.

2. In a method of preparing a polyester by reacting, at a temperature up to about 300° C., a lactone having six carbon atoms in the ring with an organic compound having at least one reactive site capable of opening the lactone ring in a radical selected from the group consisting of hydroxyl and amino radicals attached thereto, the improvement which comprises carrying out the reaction in the presence of between about 0.001 and 1% by weight, based on the weight of lactone, of an organic tin compound selected from the group consisting of compounds having one of the general formulae:

and

in which the X's are members selected from the group consisting of alkyl, aryl, aralkyl and aryloxy radicals and the X"'s are members selected from the group consisting of alkyl, aryl, aralkyl, acyloxy, halogen and hydroxy radicals.

3. Method defined in claim 2 wherein the organic tin compound is a dialkyl tin oxide.

4. Method defined in claim 2 wherein the organic tin compound is a dialkyl tin dichloride.

5. Method defined in claim 2 wherein the organic tin compound is a trialkyl tin acetate.

6. Method defined in claim 2 wherein the organic tin compound is a trialkyl tin hydroxide.

7. Method defined in claim 2 wherein the organic tin compound is a tetraaryl tin.

8. In a method of preparing a polyester by reacting, at a temperature up to about 300° C., an epsilon-caprolactone with an organic compound having at least one radical selected from the group consisting of hydroxyl and amino radicals attached thereto, the improvement which comprises carrying out the reaction in the presence of between about 0.001 and 1% by weight, based on the weight of lactone, of a manganese salt of a carboxylic acid.

9. In a method of preparing a polyester by reacting, at a temperature up to about 300° C., an epsilon-caprolactone with an organic compound having at least one radical selected from the group consisting of hydroxyl and amino radicals attached thereto, the improvement which comprises carrying out the reaction in the presence of between about 0.001 and 1% by weight, based on the weight of lactone, of a lead salt of a carboxylic acid.

10. A method of preparing a polyester which comprises heating a lactone having from six to eight carbon atoms in the ring with an organic compound having at least one reactive site capable of opening the lactone ring in a radical selected from the group consisting of hydroxyl and amino radicals attached thereto, to a temperature within the range of about 50 to about 300° C. in the presence of between about 0.001 and 1% by weight, based on the weight of lactone, of a catalyst selected from the group consisting of organic tin compounds having at least one carbon to tin bond and carboxylic acid salts of lead and manganese.

11. A method of preparing a polyester which comprises heating a lactone having six carbon atoms in the ring with an initiator to a temperature within the range of about 50 to about 300° C. in the presence of between about 0.001 and 1% by weight, based on the weight of lactone, of an organic tin compound selected from the group consisting of compounds having one of the general formulae:

and

in which the X's are members selected from the group consisting of alkyl, aryl, aralkyl and aryloxy radicals and the X"'s are members selected from the group consisting of alkyl, aryl, aralkyl, acyloxy, halogen and hydroxy radicals.

12. Method defined in claim 11 wherein the organic tin compound is a dialkyl tin oxide.

13. Method defined in claim 11 wherein the organic tin compound is a dialkyl tin dichloride.

14. Method defined in claim 11 wherein the organic tin compound is a trialkyl tin acetate.

15. Method defined in claim 11 wherein the organic tin compound is a trialkyl tin hydroxide.

16. Method defined in claim 11 wherein the organic tin compound is a tetraaryl tin.

17. A method of preparing a polyester which comprises heating an epsilon-caprolactone with an organic compound having at least one radical selected from the group consisting of hydroxyl and amino radicals attached thereto, to a temperature within the range of about 50 to about 250° C. in the presence of between about 0.001 and 1% by weight, based on the weight of lactone, of a manganese salt of a carboxylic acid.

18. A method of preparing a polyester which comprises heating an epsilon-caprolactone with an organic compound having at least one radical selected from the group consisting of hydroxyl and amino radicals attached thereto, to a temperature within the range of about 50 to about 250° C. in the presence of between about 0.001 and 1% by weight, based on the weight of lactone, of a lead salt of a carboxylic acid.

References Cited in the file of this patent

UNITED STATES PATENTS

| | | |
|---|---|---|
| 2,153,801 | Hovey et al. | Apr. 11, 1939 |
| 2,361,036 | Kung | Oct. 24, 1944 |
| 2,455,731 | Caldwell | Dec. 7, 1948 |
| 2,555,385 | Watson | June 5, 1951 |
| 2,720,505 | Caldwell et al. | Oct. 11, 1955 |
| 2,720,507 | Caldwell | Oct. 11, 1955 |